Figure 1:
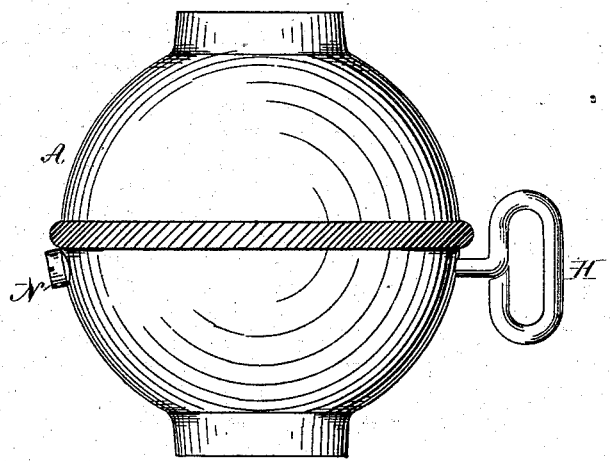

W. E. PUFFER.
Water-Filter.

No. 219,516.          Patented Sept. 9, 1879.

UNITED STATES PATENT OFFICE.

WILLIAM E. PUFFER, OF NEW YORK, N. Y.

IMPROVEMENT IN WATER-FILTERS.

Specification forming part of Letters Patent No. 219,516, dated September 9, 1879; application filed August 21, 1879.

*To all whom it may concern:*

Be it known that I, WM. E. PUFFER, of the city and State of New York, have invented a new and useful Improvement in Water-Filters, of which the following is a specification.

My invention consists of putting a tube through the body of a filter, its ends being supported or held in their place by projections made from the strainers, which hold the filtering material, thus leaving an unobstructed hole through the filtering material and strainers. In the tube I place a valve so arranged that when the valve is open the water will pass through the tube freely and without being filtered. When the valve is closed the water will pass through the strainers and filtering material, and come out at the bottom slowly and well filtered.

I shall put my improvement into large and small filters.

The construction and operation of my improved filter will be readily understood by referring to the drawings accompanying this specification, in which—

Figure 2:
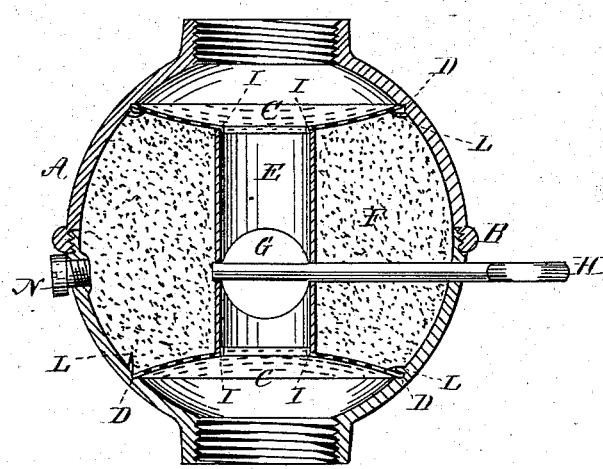

Figure 1 is a side elevation of a faucet-filter. Fig. 2 is a vertical section of it in such drawings.

A denotes the shells, made of thick solid material, screwed together at B. C C are strainers or perforated sheet metal, fastened to the shells, with a groove, D, made in shell, or projection L left on the casting, to hold the strainers in their place firmly without soldering. E is a tube passing from strainers C C through the body of the filter, and surrounded by the filtering material F. The tube E is held in its place by projections made from the strainers C C at I I. In the tube E, I place valve G, to be operated from the outside of shells A with handle H.

When the valve G is open the water will pass through the tube E freely without being filtered. When closed it prevents the water from passing through the tube E. The water then will pass through the strainers and filtering material F.

N is a small adjustable screw, to allow the filtering material to be put into the chamber after the filter is put together. The whole constitutes a filter constructed so that it can be put together and taken apart without soldering, and will supply filtered or unfiltered water, as desired.

I claim—

1. The tube E, passing through the body of the filter, surrounded by filtering material F, the tube being provided with a valve, for the purpose specified.

2. The tube E, held in its place by projections from strainers C C at I I.

3. The strainers C C, held in place by a groove or a projection made on the castings or shells A at D and L.

W. E. PUFFER.

Witnesses:
  CHAS. S. SHREVE,
  H. A. HALL.